US012348010B2

(12) United States Patent
Escure et al.

(10) Patent No.: US 12,348,010 B2
(45) Date of Patent: Jul. 1, 2025

(54) GROUNDING DEVICE FOR ELECTRIC FENCE

(71) Applicant: TransGard LLC, York, PA (US)

(72) Inventors: Ryan Escure, York, PA (US); William Reichard, York, PA (US)

(73) Assignee: TRANSGARD LLC, York, PA (US)

( * ) Notice: Subject to any disclaimer, the term of this patent is extended or adjusted under 35 U.S.C. 154(b) by 608 days.

(21) Appl. No.: 17/720,522

(22) Filed: Apr. 14, 2022

(65) Prior Publication Data

US 2022/0393442 A1 Dec. 8, 2022

Related U.S. Application Data

(60) Provisional application No. 63/195,851, filed on Jun. 2, 2021.

(51) Int. Cl.
*E04H 17/00* (2006.01)
*H02B 1/16* (2006.01)
*H02J 1/04* (2006.01)

(52) U.S. Cl.
CPC ............ *H02B 1/16* (2013.01); *E04H 17/017* (2021.01); *H02J 1/04* (2013.01)

(58) Field of Classification Search
CPC ............ E04H 17/017; H02B 1/16; H02J 1/14
See application file for complete search history.

(56) References Cited

U.S. PATENT DOCUMENTS

| 6,519,131 | B1 * | 2/2003 | Beck ..................... | A01K 15/04 |
| | | | | 361/232 |
| 6,712,339 | B1 * | 3/2004 | Smith .................... | A01K 3/005 |
| | | | | 256/10 |
| 2008/0186172 | A1 * | 8/2008 | Thompson ............... | H05C 3/00 |
| | | | | 340/541 |
| 2016/0029466 | A1 * | 1/2016 | DeMao ............. | G01R 31/2827 |
| | | | | 307/154 |
| 2017/0303375 | A1 * | 10/2017 | Woodhead ............... | H05C 1/04 |

FOREIGN PATENT DOCUMENTS

| DE | 102006032067 A1 * | 2/2007 | ............ H05C 3/00 |
| WO | WO-2004070149 A2 * | 8/2004 | ............ A01K 3/005 |

\* cited by examiner

*Primary Examiner* — Harry R Behm
(74) *Attorney, Agent, or Firm* — Troutman Pepper Locke LLP

(57) ABSTRACT

A disclosed electric fence system includes an electric fence; an energizer for generating a plurality of electric pulses applied to the electric fence; a detection circuit for monitoring a voltage of the electric fence; and a grounding device for grounding the electric fence when the electric fence is off. The grounding device is connected to the electric fence, the energizer, the detection circuit, and the ground.

10 Claims, 4 Drawing Sheets

GROUNDING DEVICE FOR ELECTRIC FENCE

CROSS-REFERENCE TO RELATED APPLICATIONS

The present application is a claims priority from U.S. Provisional Patent Application No. 63/195,851, titled Grounding Device for Electric Fence, filed Jun. 2, 2021, which is incorporated by reference herein in its entirety.

TECHNICAL FIELD

The present disclosure relates to an electric fence, and, more particularly, to a grounding device for grounding an electric fence.

BACKGROUND

Perimeter fencing, such as an electric fence, is used to keep trespassers from entering protected areas. Generally, an electric energizer is used to deliver a voltage to conductive portions of an electric fence. The energizer applies a high voltage at quick cycles, such as 10,000V pulses every 1.5 seconds to fence panels. The fence panels are not connected to the ground, and thus there is a floating voltage of 10,000V on the fence panels. When the electric fence is shut off, it is desired to eliminate the floating voltage from the fence panels, so that no electric shocks are generated due to either an induced voltage or a stray voltage on the fence panels. The disclosed system and methods address these and other problems of the prior art.

SUMMARY

In one aspect, the present disclosure includes embodiments of an electric fence system, including an electric fence; an energizer for generating a plurality of electric pulses applied to the electric fence; a detection circuit for monitoring a voltage of the electric fence; and a grounding device for grounding the electric fence when the electric fence is off. The grounding device is electrically connected to the electric fence, the energizer, the detection circuit, and ground.

The present disclosure further provides an electric fence system, wherein the grounding device includes a plurality of isolation relays, each isolation relay includes a coil and a switch, wherein each switch is in an open position when the electric fence is on, and each switch is in a closed position when the electric fence is off.

The present disclosure further provides an electric fence system, wherein the grounding device includes four isolation relays, each isolation relay includes a coil and a switch, wherein each switch is in an open position when the electric fence is on, and each switch is in a closed position when the electric fence is off.

The present disclosure further provides an electric fence system, wherein the grounding device includes a first isolation relay, a second isolation relay, a third isolation relay, and a fourth isolation relay, wherein the first isolation relay includes a first coil and a first switch; the second isolation relay includes a second coil and a second switch; the third isolation relay includes a third coil and a third switch; the fourth isolation relay includes a fourth coil and a fourth switch, wherein one end of the first switch is connected to the ground, and the other end of the first switch is connected to a positive terminal of the energizer; one end of the second switch is connected to the ground, and the other end of the second switch is connected to a negative terminal of the energizer; one end of the third switch is connected to the ground, and the other end of the third switch is connected to a negative terminal of the detection circuit; one end of the fourth switch is connected to the ground, and the other end of the fourth switch is connected to a positive terminal of the detection circuit.

The present disclosure further provides an electric fence system, wherein the first switch, the second switch, the third switch, and the fourth switch are all in an open position when the electric fence is on; the first switch, the second switch, the third switch, and the fourth switch are all in a closed position when the electric fence is off.

The present disclosure further provides an electric fence system, wherein the energizer, the grounding device, and the detection circuit are placed in the same enclosure.

The present disclosure further provides an electric fence system, further comprising an entryway, wherein the enclosure is attached to one side of the entryway.

The present disclosure further provides an electric fence system, further comprising a direct current (DC) power supply, wherein the DC power supply is placed in the enclosure.

The present disclosure further provides an electric fence system, further comprising a power source electrical circuit for converting alternating current (AC) 110 volts to DC 12 volts, wherein an output of the power source electrical circuit is connected to the DC power supply.

The present disclosure further provides an electric fence system, wherein the electric fence includes at least a first fence panel connected to the energizer and a second fence panel connected to the detection circuit, wherein the first fence panel includes at least a first fence section, a second fence section, a third fence section, and a fourth fence section, and the second fence panel includes at least a fifth fence section, a sixth fence section, a seventh section, and an eighth section, wherein the first and third fence sections are connected to a positive terminal of the energizer, the second and fourth fence sections are connected to a negative terminal of the energizer, wherein the fifth and seventh fence sections are connected to a positive terminal of the detection circuit, and the sixth and eighth fence sections are connected to a negative terminal of the detection circuit.

DETAILED DESCRIPTION

Perimeter fencing such as electric fencing is helpful in keeping trespassers (e.g., human, wildlife, etc.) from entering and damaging outdoor structures such as, for example, power plants, electrical sub-stations, and the like. The present disclosure provides an electric fence system including a grounding device, configured to divert any potential voltage or induced voltage that could be on the electric fence to ground when the power input to the electric fence is shut off.

Figure 1:
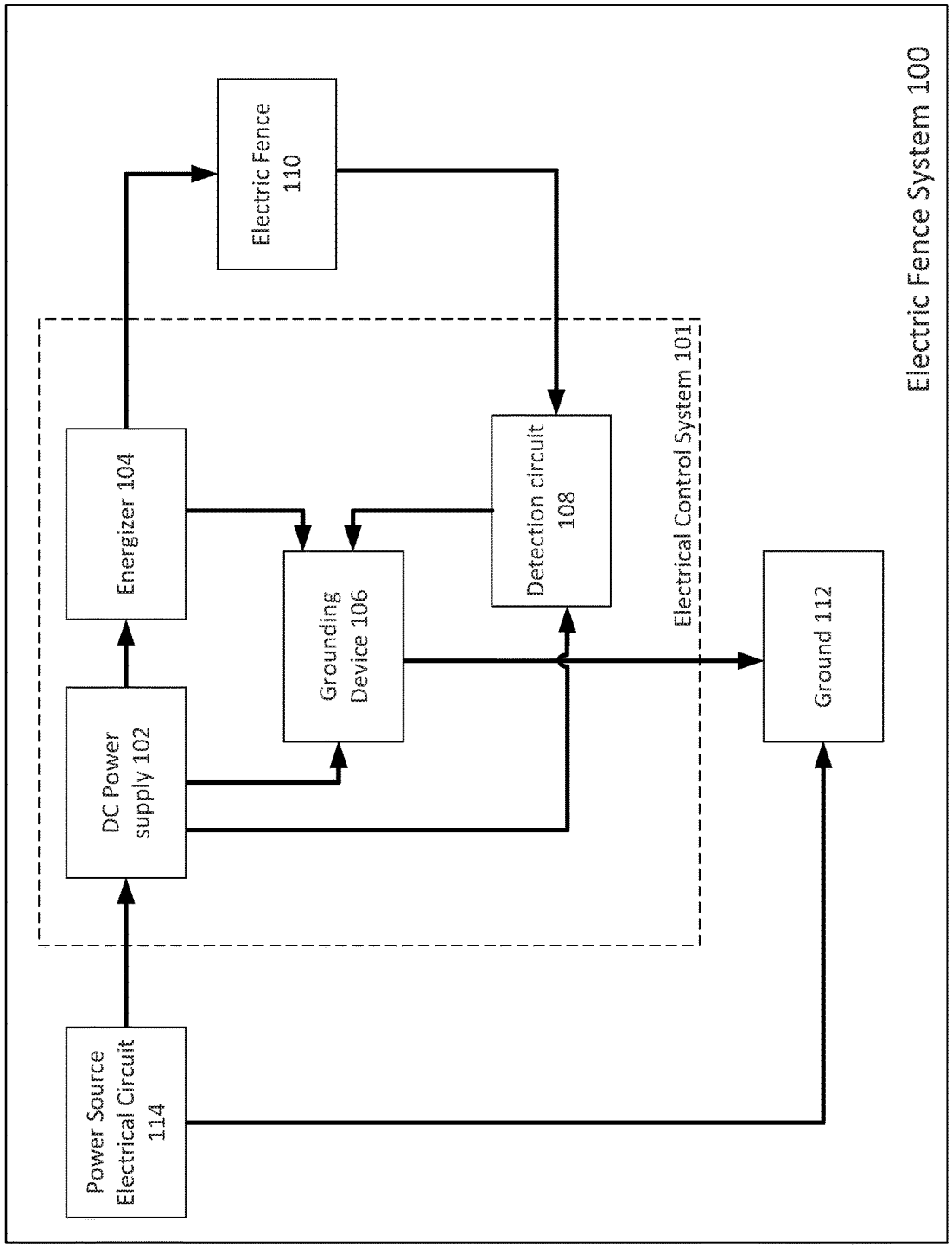
FIG. 1 illustrates a block diagram of an exemplary electric fence system 100, according to disclosed embodiments.

FIG. 1 illustrates a block diagram of an exemplary electric fence system 100. As shown in FIG. 1, in an embodiment, the electric fence system 100 includes an electrical control system 101, an electric fence 110, and ground 112. The electrical control system 101 further includes direct current (DC) power supply 102, energizer 104, grounding device 106, and detection circuit 108. The DC power supply 102 is used to provide power, e.g., a 12 volts DC power, to the energizer 104, the grounding device 106, and the detection circuit 108. The energizer 104 can generate high voltage (e.g., 10,000 volts) electrical pulses to be applied to the electric fence 110. The grounding device 106 is used to divert any potential voltage or induced voltage on the electric fence 110 to ground 112 when no high voltage electric pulses are applied to the electric fence 110 due to a DC power outage or the electric fence system 100 being shut down. The detection circuit 108 is used to monitor the electric fence voltage. If there is no fence voltage for a period of time, i.e., no high voltage electric pulses are applied to the electric fence 110 for a period of time, then an alarm is triggered to notify an operator that the electric fence 110 is not working properly. In an embodiment, the detection circuit 108 may include a voltage sensor. The electric fence 110 may include exposed conductive elements (e.g., stainless steel or aluminum) configured to divert the electrical pulses via contact with the electric fence 110, such that the electric fence 110 may be used as a deterrent barrier against entry to a particular area (e.g., a power station).

In an embodiment, the electric fence system 100 can further include a power source electrical circuit 114, configured to supply alternating current (AC) 110V.

In an embodiment, the electrical control system 101, including DC power supply 102, energizer 104, grounding device 106, and detection circuit 108, can be placed in the same case, enclosure, or box called, e.g., "control center" or "control system." The case, enclosure, or box can be made of any materials, e.g., metal, plastic, etc.

Figure 2:
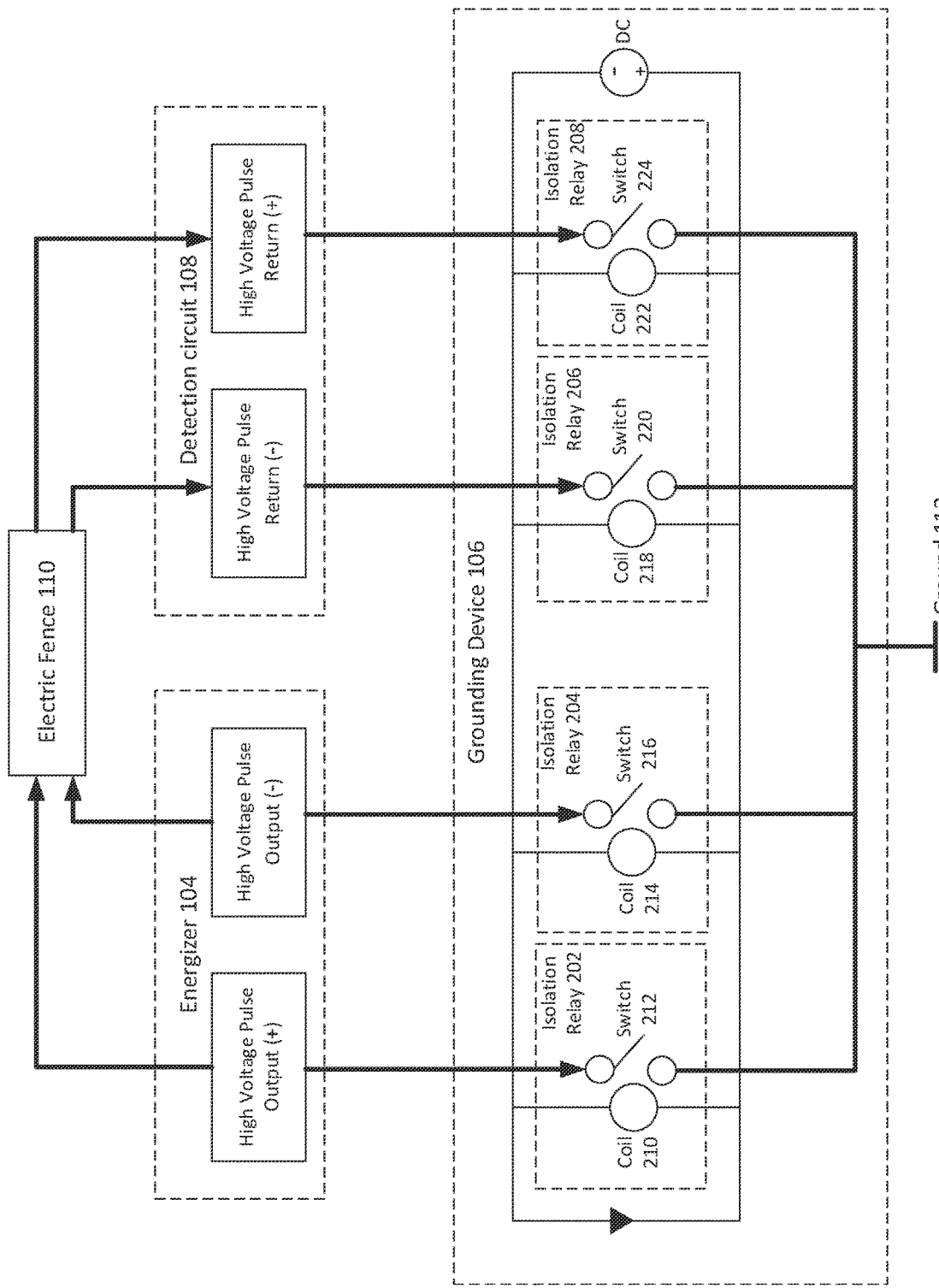
FIG. 2 illustrates a block diagram of an exemplary grounding device 106, according to disclosed embodiments.

FIG. 2 illustrates a block diagram of an exemplary grounding device 106. As shown in FIG. 2, the grounding device 106 includes one or more isolation relays. For example, in the embodiment shown in FIG. 2, there are four isolation relays 202, 204, 206, and 208 rated at 10,000 volts, i.e., the four isolation relays 202, 204, 206, and 208 can withstand up to 10,000 volts. Isolation relay 202 includes coil 210 and switch 212; isolation relay 204 includes coil 214 and switch 216; isolation relay 206 includes coil 218 and switch 220; isolation relay 208 includes coil 222 and switch 224.

Each switch is in an open position during a normal operation when the electric fence 110 is on. When the power of the electric fence 110 is shut off, each switch is closed. Then the electric fence 110 is connected to the ground through the grounding device 106. In an embodiment, one end of the switch 212 is connected to the ground 112 (e.g., the ground of a power station), while the other end of the switch 212 is connected to a positive terminal of the energizer 104 (i.e., a positive terminal of high voltage pulse output). One end of the switch 216 is connected to the ground 112, while the other end of the switch 216 is connected to a negative terminal of the energizer 104 (i.e., a negative terminal of high voltage pulse output). One end of the switch 220 is connected to the ground 112, while the other end of the switch 220 is connected to a negative terminal of the detection circuit 108 (i.e., a negative terminal of high voltage pulse return). One end of the switch 224 is connected to the ground 112, while the other end of the switch 224 is connected to a positive terminal of the detection circuit 108 (i.e., a positive terminal of high voltage pulse return). The high voltage pulses are output from the energizer 104 to the electric fence 110, and then returned to the detection circuit 108 from the electric fence 110.

When the electric fence 110 is on (i.e., in a normal operation mode), a coil in each isolation relay is energized, and the associated switch is in an open position due to the magnetic force generated by the energized coil. All the switches are in an open position and are isolated from each other. When the electric fence 110 is off (e.g., the power for the electric fence 110 is shut off, or there is any malfunction in the electric fence system 100), the coil in each isolation relay is de-energized, and thus no magnetic force is generated. Accordingly, the switch in each isolation relay is in a closed position due to the loss of the magnetic force. If the switch in each isolation relay is in a closed position, the positive terminal of high voltage pulse output, the negative terminal of high voltage pulse output, the positive terminal of high voltage pulse return, and the negative terminal of high voltage pulse return are all connected to the ground 112, and thus the high voltage applied to the electric fence 110 can be eliminated—i.e., run to the ground 112—to secure the safety of the electric fence 110.

In an embodiment, when the electric fence 110 is on, the coils 210, 214, 218, and 222 are energized, and the switches 212, 216, 220, and 224 are all in an open position due to the magnetic force generated by the energized coils 210, 214, 218, and 222, respectively. All the switches 212, 216, 220, and 224 are in an open position and are isolated from each other. When the electric fence 110 is off, the coils 210, 214, 218, and 222 are de-energized, and thus no magnetic force is generated. Accordingly, the switches 212, 216, 220, and 224 are all in a closed position due to the loss of the magnetic force, and the positive terminal of high voltage pulse output, the negative terminal of high voltage pulse output, the positive terminal of high voltage pulse return, and the negative terminal of high voltage pulse return are all connected to the ground 112.

As shown in FIGS. 1 and 2, the grounding device 106 is electrically connected to the energizer 104 (the beginning of the electric fence system 100 circuit) and the detection circuit 108 (the end of the electric fence system 100 circuit). Thus, even if the electric fence 110 is disconnected or damaged internally, or any adjacent fence panels of the electric fence 110 are physically separated from each other, the fence panels that are connected to the energizer 104 and the detection circuit 108 (i.e., fence panels connected to two ends of the damaged/disconnected/unbonded electric fence 110) are still properly grounded.

Figure 3:
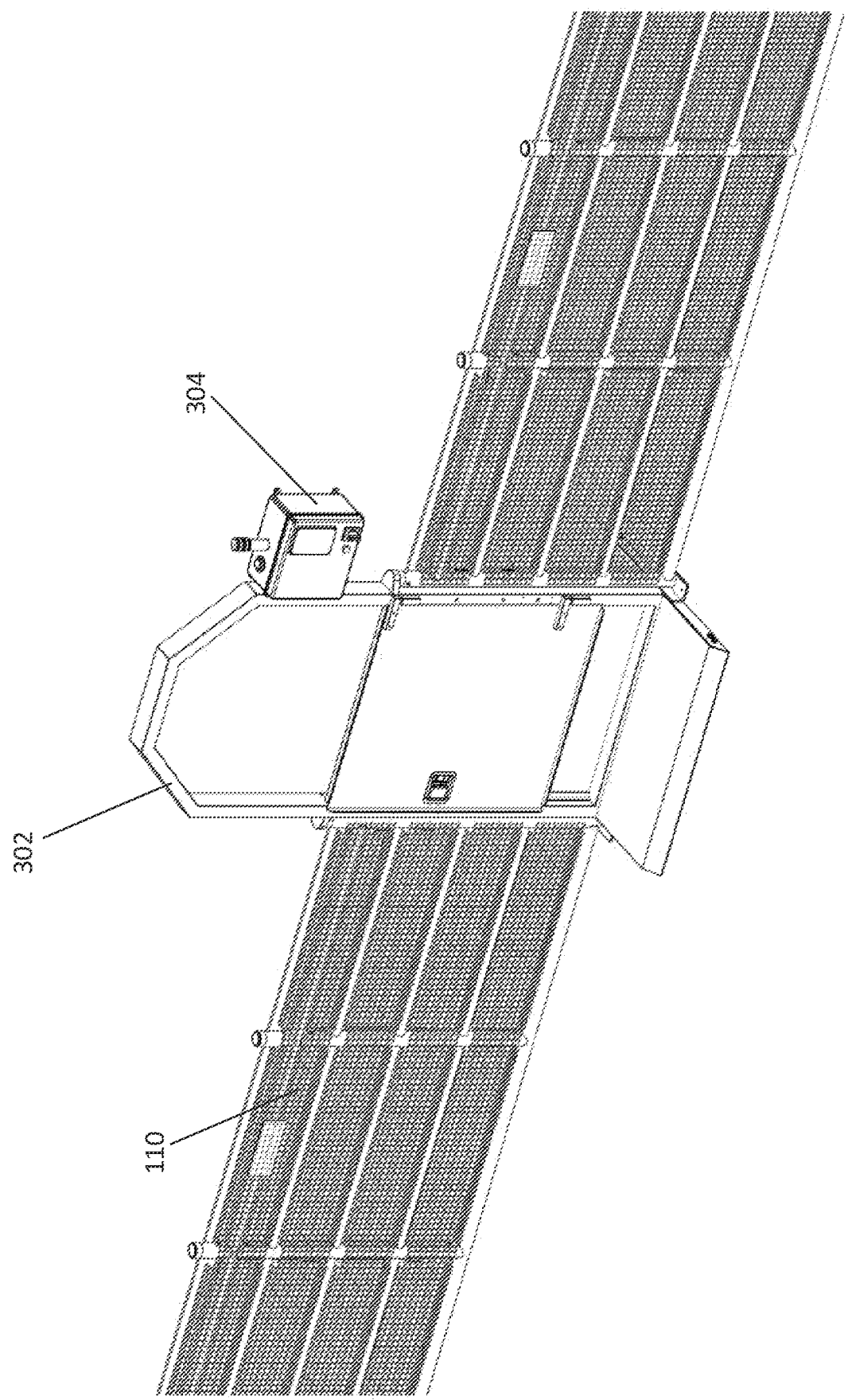
FIG. 3 illustrates an exemplary electric fence system 100, according to disclosed embodiments.

FIG. 3 illustrates an exemplary electric fence system 100. As shown in FIGS. 1 and 3, the electric fence system 100 includes an electric fence 110, and a case or enclosure 304 accommodating the electrical control system 101, which includes DC power supply 102, energizer 104, grounding device 106, and detection circuit 108. In an embodiment, the case or enclosure 304 can be called "control center" or "control system." In an embodiment, the electric fence system 100 further includes an entryway 302. The entryway 302 is grounded, while the electric fence 110 is floating (i.e., ungrounded). In an embodiment, the case or enclosure 304 is placed on one side of the entryway 302. The case or enclosure 304 can be made of any materials, e.g., metal, plastic, etc.

Figure 4:
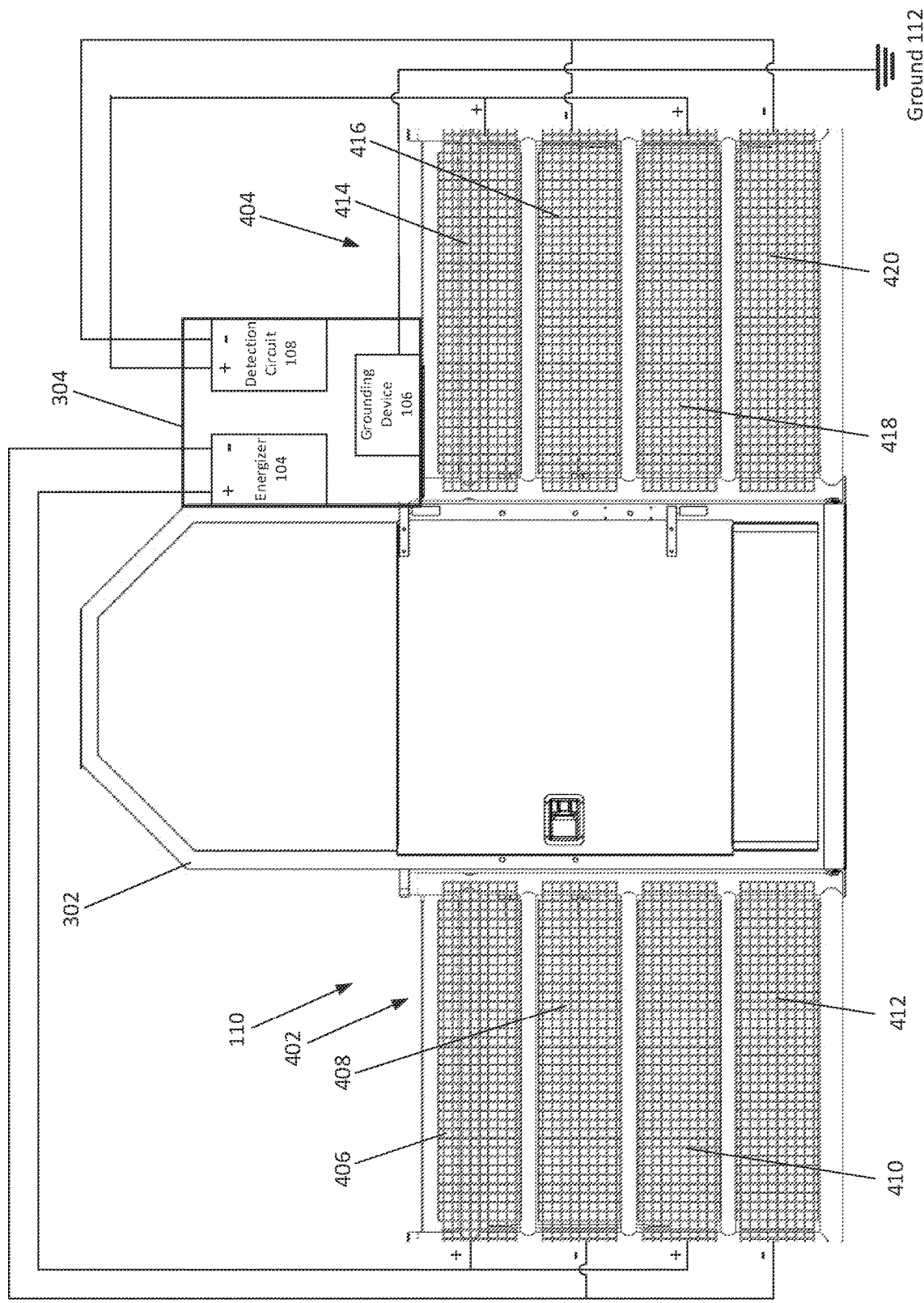
FIG. 4 illustrates another exemplary electric fence system 100 indicating a connection between the electric fence 110 and the "control center" 304, according to disclosed embodiments.

FIG. 4 illustrates another exemplary electric fence system 100, indicating a connection between the electric fence 110 and the "control center" 304. As shown in FIG. 4, the electric fence 110 can include one or more fence panels, e.g., fence panel 402 and fence panel 404. Each fence panel 402, 404 includes one or more fence sections. For example, the fence panel 402 includes fence section 406, fence section 408, fence section 410, and fence section 412. The fence panel 404 includes fence section 414, fence section 416, fence section 418, and fence section 420. The positive terminal of the energizer 104 (i.e., a positive terminal of high voltage pulse output) is connected to the fence section 406 and the fence section 410. The negative terminal of the energizer 104 (i.e., a negative terminal of high voltage pulse output) is connected to the fence section 408 and the fence section 412. The positive terminal of the detection circuit 108 (i.e., a positive terminal of high voltage pulse return) is connected to the fence section 414 and the fence section 418. The negative terminal of the detection circuit 108 (i.e., a negative terminal of high voltage pulse return) is connected to the fence section 416 and the fence section 420. When the electric fence 110 is on, the electric pulses (i.e., high voltage pulses) are output from energizer 104 and returned back to the detection circuit 108 through the electric fence 110. When the electric fence 110 is off due to, e.g., power outage or any malfunction in the electric fence system 100, the floating fence panel 402 and fence panel 404 are connected to the ground 112 through the grounding device 106.

The elements of the figures are not exclusive. Other embodiments may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention.

What is claimed is:

1. An electric fence system, comprising:
   an electric fence;
   an energizer for generating a plurality of electric pulses applied to the electric fence;
   a detection circuit for monitoring a voltage of the electric fence; and
   a grounding device for grounding the electric fence when the electric fence is off,
   wherein the grounding device is connected to the electric fence, the energizer, the detection circuit, and ground, and includes four isolation relays, wherein each isolation relay includes a coil and a switch, and each switch is in an open position when the electric fence is on, and in a closed position when the electric fence is off.

2. The electric fence system of claim 1, wherein the grounding device includes a first isolation relay, a second isolation relay, a third isolation relay, and a fourth isolation relay, wherein the first isolation relay includes a first coil and a first switch; the second isolation relay includes a second coil and a second switch; the third isolation relay includes a third coil and a third switch; the fourth isolation relay includes a fourth coil and a fourth switch, wherein one end of the first switch is connected to the ground, and the other end of the first switch is connected to a positive terminal of the energizer; one end of the second switch is connected to the ground, and the other end of the second switch is connected to a negative terminal of the energizer; one end of the third switch is connected to the ground, and the other end of the third switch is connected to a negative terminal of the detection circuit; one end of the fourth switch is connected to the ground, and the other end of the fourth switch is connected to a positive terminal of the detection circuit.

3. The electric fence system of claim 2, wherein the first switch, the second switch, the third switch, and the fourth switch are all in an open position when the electric fence is on; the first switch, the second switch, the third switch, and the fourth switch are all in a closed position when the electric fence is off.

4. The electric fence system of claim 2, wherein the electric fence includes at least a first fence panel connected to the energizer and a second fence panel connected to the detection circuit, wherein the first fence panel includes at least a first fence section, a second fence section, a third fence section, and a fourth fence section, and the second fence panel includes at least a fifth fence section, a sixth fence section, a seventh section, and an eighth section, wherein the first and third fence sections are connected to a positive terminal of the energizer, the second and fourth fence sections are connected to a negative terminal of the energizer, wherein the fifth and seventh fence sections are connected to a positive terminal of the detection circuit, and the sixth and eighth fence sections are connected to a negative terminal of the detection circuit.

5. The electric fence system of claim 1, wherein the energizer, the grounding device, and the detection circuit are placed in a same enclosure.

6. The electric fence system of claim 5, further comprising an entryway, wherein the enclosure is attached to one side of the entryway.

7. The electric fence system of claim 5, further comprising a direct current (DC) power supply, wherein the DC power supply is placed in the enclosure.

8. The electric fence system of claim 7, further comprising a power source electrical circuit for supplying alternating current (AC) 110 volts, wherein an output of the power source electrical circuit is connected to the DC power supply.

9. The electric fence system of claim 1, wherein the electric fence includes at least a first fence panel connected to the energizer and a second fence panel connected to the detection circuit, wherein the first fence panel includes at least a first fence section, a second fence section, a third fence section, and a fourth fence section, and the second fence panel includes at least a fifth fence section, a sixth fence section, a seventh section, and an eighth section, wherein the first and third fence sections are connected to a positive terminal of the energizer, the second and fourth fence sections are connected to a negative terminal of the energizer, wherein the fifth and seventh fence sections are connected to a positive terminal of the detection circuit, and the sixth and eighth fence sections are connected to a negative terminal of the detection circuit.

10. The electric fence system of claim 1, wherein a circuit of the electric fence system begins at the energizer and ends at the detection circuit; if any adjacent fence panels of the electric fence are disconnected to each other, fence panels of the electric fence connected to two ends of the electric fence are grounded.

* * * * *